United States Patent
Cheng et al.

(10) Patent No.: US 10,625,341 B2
(45) Date of Patent: Apr. 21, 2020

(54) STAMPING DIE ADJUSTMENT METHOD

(71) Applicant: FORD MOTOR COMPANY, Dearborn, MI (US)

(72) Inventors: James Chih Cheng, Troy, MI (US); Mohammed Omar Faruque, Ann Arbor, MI (US); Yijung Chen, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 871 days.

(21) Appl. No.: 15/154,204

(22) Filed: May 13, 2016

(65) Prior Publication Data

US 2017/0326648 A1 Nov. 16, 2017

(51) Int. Cl.
| | | |
|---|---|---|
| *B22F 5/00* | (2006.01) | |
| *B22F 7/08* | (2006.01) | |
| *B21D 37/20* | (2006.01) | |
| *B22F 3/105* | (2006.01) | |
| *B22F 7/04* | (2006.01) | |
| *B33Y 10/00* | (2015.01) | |

(52) U.S. Cl.
CPC .............. *B22F 5/007* (2013.01); *B21D 37/20* (2013.01); *B22F 3/1055* (2013.01); *B22F 7/04* (2013.01); *B22F 7/08* (2013.01); *B22F 2007/045* (2013.01); *B33Y 10/00* (2014.12)

(58) Field of Classification Search
CPC .......... B21D 37/20; B22F 3/1055; B22F 7/08; B22F 7/04; B22F 5/007; B22F 2007/045; B33Y 10/00
See application file for complete search history.

(56) References Cited

U.S. PATENT DOCUMENTS

| | | | |
|---|---|---|---|
| 5,247,861 A | 9/1993 | Jahn | |
| 7,587,919 B1 | 9/2009 | Young | |
| 2013/0255346 A1* | 10/2013 | Danby | B21D 22/02 72/352 |

FOREIGN PATENT DOCUMENTS

| | | |
|---|---|---|
| CN | 1724208 A | 1/2006 |
| CN | 101549381 A | 10/2009 |
| CN | 201324789 Y | 10/2009 |
| CN | 102019531 A | 4/2011 |
| CN | 102528376 A | 7/2012 |
| CN | 103920804 A | 7/2014 |

(Continued)

OTHER PUBLICATIONS

Bahrs Die & Stamping, Stamping Tool & Die Repair, http://www.bahrsdie.com/stampingtooldierepair, Nov. 18, 2015, 1 page.

(Continued)

*Primary Examiner* — Daniel C. McCracken
(74) *Attorney, Agent, or Firm* — Vincent Mastrogiacomo; Brooks Kushman P.C.

(57) ABSTRACT

A method of adjusting a stamping die is provided. The method includes providing a two-sided stamping die configured to form parts from sheet metal blanks according to a desired geometry upon closing the die, adjusting the desired geometry of the part, and repeatedly depositing layer upon layer of material onto a first side of the die in a stacked configuration to modify the geometry of the first side of the die such that the die forms parts from sheet metal blanks according to the adjusted desired geometry.

20 Claims, 2 Drawing Sheets

(56) References Cited

FOREIGN PATENT DOCUMENTS

| CN | 103921087 A | 7/2014 |
| CN | 104233238 A | 12/2014 |
| JP | H07186157 A | 7/1995 |
| WO | 9508416 A1 | 3/1995 |

OTHER PUBLICATIONS

Varbros LLC, Tool & Die Build and Design Services, Cleveland, OH, http://www.varbroscorp.com/tool-die-design-services.html, Mar. 19, 2016, 2 pages.

* cited by examiner

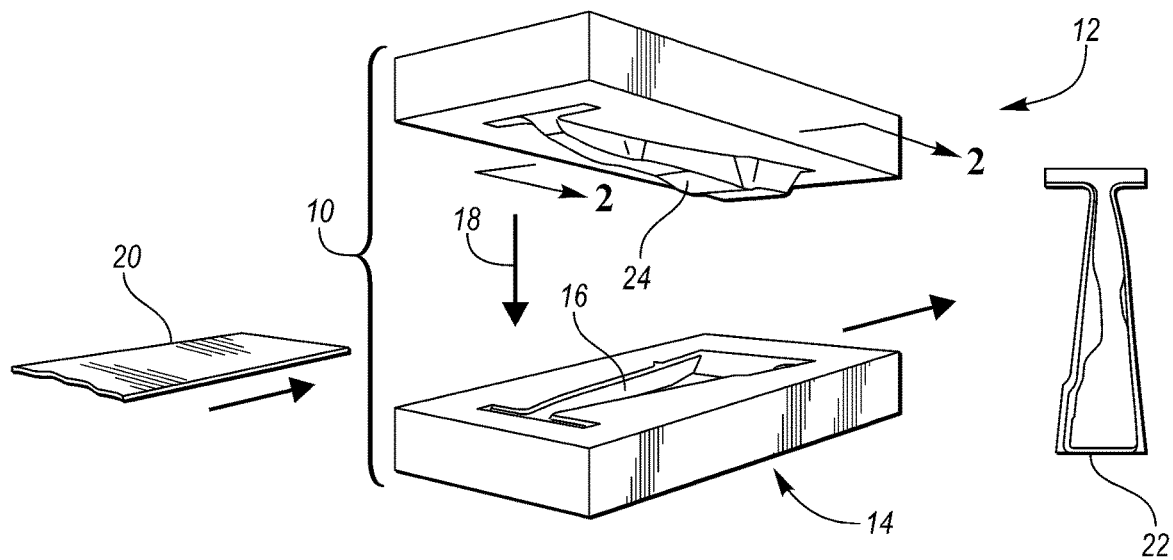
FIG. 1
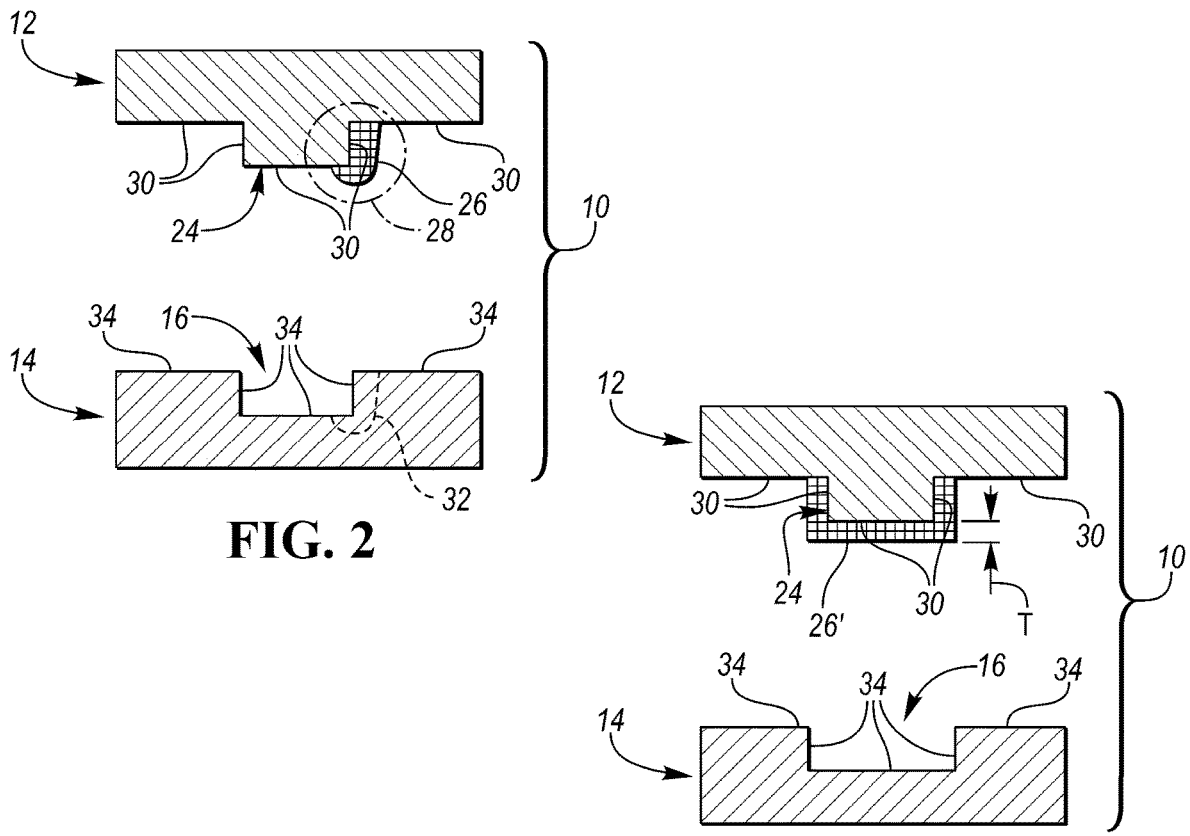
FIG. 2
FIG. 3

STAMPING DIE ADJUSTMENT METHOD

TECHNICAL FIELD

The present disclosure relates to stamping dies that are used to form parts from sheet metal.

BACKGROUND

Stamping dies may be used to manufacture products or components of products (i.e., parts) that are designed having specific detailed dimensions and shapes. Design changes in a product or component made from a stamping die may require constructing a new die resulting in a significant cost. The cost of constructing a new die may be significant enough to warrant forgoing the design change, resulting in adopting a non-optimal design for production. Additionally, dies may wear out over time or may obtain damage to localized portions as a result of use.

SUMMARY

A method of adjusting a stamping die is provided. The method includes providing a stamping die having a punch that engages a cavity defined by a die-block when the die is closed to form parts from sheet metal blanks according to a desired geometry, and repeatedly depositing layer upon layer of material onto the punch in a stacked configuration to modify a geometry of the stamping die to alter the desired geometry of the parts formed from sheet metal blanks when closing the die.

A method of adjusting a stamping die is provided. The method includes providing a two-sided stamping die configured to form parts from sheet metal blanks according to a desired geometry upon closing the die and repeatedly depositing layer upon layer of material onto a first side of the die in a stacked configuration to modify a geometry of the first side of the die such that the die forms parts from sheet metal blanks according to an adjusted desired geometry.

A method of adjusting a stamping die is provided. The method includes providing a stamping die having a punch that engages a cavity defined by a die-block along a profile of the punch when the die is closed to form parts from sheet metal blanks of a first thickness according to a desired contour; and repeatedly depositing layer upon layer of material onto the profile of the punch in a stacked configuration while maintaining the profile of the punch such that closing the die forms parts form sheet metal blanks of a second thickness that is less than the first thickness according to the desired contour.

BRIEF DESCRIPTION OF THE DRAWINGS

FIG. 1 is an isometric view of a stamping die that further illustrates a sheet metal blank and a part formed from the sheet metal blank in the stamping die;

FIG. 2 is a cross-sectional view taken along line 2-2 in FIG. 1, illustrating an adjustment of the stamping die according to a first embodiment;

FIG. 3 is a cross-sectional view taken along line 2-2 in FIG. 1, illustrating an adjustment of the stamping die according to a second embodiment.

DETAILED DESCRIPTION

Figure 4:
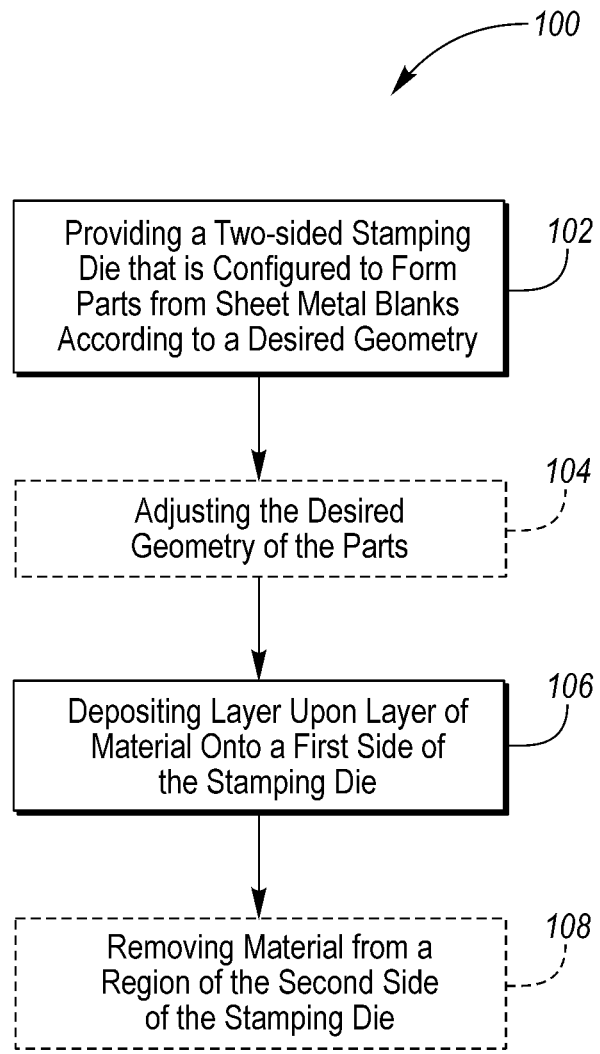
FIG. 4 is a flowchart illustrating a method of adjusting the dimensions of a stamping die.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Referring to FIG. 1, an isometric view of a stamping die 10 is illustrated. The stamping die 10 may be a two-sided stamping die. The stamping die 10 includes a die set that comprises a first side and a second side. The first side of the die set may be a punch 12 and the second side of the die set may be a die-block 14 that defines a cavity 16. The punch 12 is configured to engage the die-block 14 in a longitudinal direction 18 such that a sheet metal blank 20 that is disposed between the punch 12 and the die-block 14 forms a part 22 having a desired geometry and shape. Punch 12 and die-block 14 engagement may also be referred to as closing the die set and the longitudinal direction 18 may also be referred to as the direction of closing the die set. The sheet metal blank 20 and the part 22 may be any sheet metal material that is capable of being formed in a stamping process including, but not limited, to steel, magnesium, magnesium alloys, aluminum, and aluminum alloys. The punch 12 may include a post portion 24 that includes a contoured surface or profile that matches and conforms to the shape of the cavity 16 when the punch 12 is engaging the die-block 14 in order to transform the sheet metal blank 20 disposed between the punch 12 and die-block 14 into the final part 22.

Referring to FIG. 2, a cross-sectional view taken along line 2-2 in FIG. 1 representing an adjustment of the stamping die 10 according to a first embodiment is illustrated. In FIG. 2, the geometry of the stamping die 10 has been modified by adding layers of material 26 to a localized region 28 of the punch 12. The layers of material 26 may be added by sequentially depositing layer upon layer upon layer of material onto the punch 12 in stacked configuration (the orientation of the punch 12 would likely be rotated 180° within the plane of the cross-section when depositing the layers of material 26). The layers of material 26 may be deposited onto an exterior surface 30 of the punch 12 that engages the die-block 14, within the localized region 28. More specifically, the layers of material 26 may be deposited onto a portion of the exterior surface 30 of the punch 12 that engages the cavity 16, within the localized region 28. Although the localized region 28 is shown to having a specific location and size in FIG. 2, it should be understood that the location and size shown of the localized region 28 are for illustrative purposes only. The size and position of the localized region may be changed depending on where the layers of material are being deposited onto the exterior surface of the punch 12. The layers of material 26 may be added to the punch 12 according to a desired size, shape, and geometry in response to an adjustment in the desired geometry of the part 22 (e.g., a design change in the part). Alternatively, the layers of material 26 may be added to the punch 12 to repair the stamping die 10 in response to damage or wear and tear from using the stamping die 10. Additionally, material may be removed from a region 32 of the die-block 14 along an exterior surface 34 of the die-block 14 that defines the cavity 16 opposite of where material is being deposited onto the localized region 28 of the exterior surface 30 of the punch 12. The region 32 where material is being removed from the exterior surface 34 of the die-block 14 may create a void in the die-block 14 that matches the shape and geometry of the layers of material 26 that is being added the punch 12. Alternatively, layers of material 26 may be deposited onto a localized region of the exterior surface 34 of the die-block 14 that defines the cavity and material may be removed from a region of the punch 12 along the exterior surface 30 of the punch 12 that engages the cavity 16.

Referring to FIG. 3, a cross-sectional view taken along line 2-2 in FIG. 1 representing an adjustment of the stamping die 10 according to a second embodiment is illustrated. In FIG. 3, the geometry of the stamping die 10 has been modified by adding layers of material 26' to the entirety of the portion of exterior surface 30 of the punch 12 that engages the cavity 16 of the die-block 14. Alternatively, the geometry of the stamping die 10 may be modified by adding layers of material 26' to the entirety of the exterior surface 30 of the punch 12 that engages the die-block 14. The layers of material 26' may be added by sequentially depositing layer upon layer upon layer of material onto the punch 12 in stacked configuration (the orientation of the punch 12 would likely be rotated 180° within the plane of the cross-section when depositing the layers of material 26'). The layers of material 26' may be deposited onto the exterior surface 30 of the punch such that layers of material 26' have an overall thickness that is substantially uniform. A substantially uniform thickness may refer to plus or minus 20% of a uniform thickness, T. This includes any incremental value between 80% and 120% of the uniform thickness, T. The layers of material 26' may be added to the punch 12 in response to an adjustment in the desired geometry of the part 22 (e.g., a design change in the part). More specifically, the layers of material 26' may be added in response to design change resulting in a decrease in the gauge thickness of the part 22 corresponding to no other design change in the shape or geometry of the part 22. Alternatively, the layers of material 26' may be deposited onto to the entirety the exterior surface 34 of the die-block 14 or the entirety of a portion of exterior surface 34 of the die-block 14 that defines the cavity 16.

The material layers 26 and 26' described in FIGS. 2 and 3, respectively, may be deposited onto the surfaces of the punch 12 and/or the die-block via an additive manufacturing process. Additive manufacturing may also be referred to as 3-D printing. The additive manufacturing processes that may be used include, but are not limited to, fused deposition modeling (FDM), fused filament fabrication (FFF), robocasting or direct ink writing (DIW), powder bed and inkjet head 3D printing (3DP), electron-beam melting (EBM), selective laser melting (SLM), selective heat sintering (SHS), selective laser sintering (SLS), direct metal laser sintering (DMLS), directed energy deposition, and electron beam freeform fabrication (EBF).

The punch 12, die-block 14, and added layers of material (26 and 26') may be made from any desired tooling material. Desired tooling materials include, but are not limited to, aluminum alloys and steel alloys that may be locally hardened through a process such as heat treating. Local hardness may correspond to locations of contact between the punch 12 and/or die block and the sheet metal blanks 20 that are formed into parts 22.

Referring to FIG. 4, a method 100 of adjusting the dimensions of the stamping die 10 is illustrated. The method 100 may include adjusting the dimensions of the stamping die 10 by adding layers of material (26 or 26') in the manner described with respect to the embodiments in FIGS. 2 and 3. At step 102, the method 100 provides a two-sided stamping die 10 that is configured to form parts 22 from sheet metal blanks 20, according to a desired geometry of the parts 22, upon closing the stamping die 10 over the sheet metal blanks 20. As described above, the stamping die 10 may include a punch 12 that engages a cavity 16 defined by a die-block 14 when the die is closed to form the parts 22 according to the desired geometry. When the punch 12 engages the die-block 14 and cavity 16, the sheet metal blanks 20 are transformed into parts 22 that may have a desired contour or profile at any given cross-section. The desired contour or profile of the parts 22 at any given cross-section may correspond to a contour or profile of the punch 12 and/or a contour or profile of the die-block 14 at any given cross-section of the punch 12 or die-block 14. The desired contour or profile of the punch 12 and/or die-block 14 may correspond to the exterior surface 30 of the punch 12 that engages the die-block 14 and exterior surface 34 of the die-block 14 that defines the cavity 16, respectively.

The method 100 then moves on to step 104, where the desired geometry of the parts 22 is adjusted. The design change in the desired geometry may be a change to the contour or profile of the parts 22 or may be a change in the gauge thickness that does not alter the contour or profile of the parts 22. Once the desired geometry of the parts 22 has been adjusted, the method 100 moves on to step 106.

At step 106, layer upon layer of material is repeatedly depositing onto a first side of the stamping die 10 (either the punch 12 or the die-block 14) in a stacked configuration to modify the geometry of the first side of the stamping die 10 such that the stamping die 10 forms the parts 22 from the sheet metal blanks 20 according to the adjusted desired geometry. The material layers may be added through any of the additive manufacturing processes described above. The layers of material may be added to a localized region of the first side of the stamping die 10 or to the entirety of an exterior surface, as described above. If adding the material layers to the stamping die 10 results in an adjustment the contour or profile of stamping die 10 (i.e., an adjustment to the contour or profile of the exterior surface 30 of the punch 12 or the exterior surface 34 of the die-block 14), there will be a corresponding change in the contour or profile of the parts 22. If the added material layers form a substantially uniform layer over the entirety of an exterior surface of the first side of the stamping die 10, there will be no change in the contour or profile of the parts 22. Adding a substantially uniform layer over the entirety of an exterior surface of the first side of the stamping die 10, however, will reconfigure the stamping die 10 to produce the parts 22 at a different gauge thickness.

Alternatively, material may be deposited layer upon layer onto the first and/or second sides of the stamping die 10 in response to wear or damage of the stamping die. In this alternative embodiment, step 104 may be omitted and step 106 will result in forming the parts according to the desired geometry in step 102 and not the adjusted desired geometry of step 104.

Next, the method moves on to step 108, where material may be removed from a region of the second side of the stamping die 10 (either the punch 12 or the die-block 14) opposite of where material was deposited onto the exterior surface of the first side of the stamping die 10. The removal of material from the exterior surface of the second side of the stamping die 10 may create a void that matches the shape and geometry of the layers of material that were deposited onto the first side of the stamping die 10. Under certain circumstances and depending on how the first side of the stamping die 10 is altered (by the addition of layers of material), step 108 may not be necessary and may be omitted entirely.

The flowchart illustrating the method 100 in FIG. 4 is for illustrative purposes only. It should be understood that some of the steps or blocks of the method 100 may rearranged or omitted entirely.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A method comprising:
   providing a stamping die having a punch that engages a cavity defined by a die-block when the die is closed to form parts from sheet metal blanks according to a desired geometry;
   closing the stamping die to form a first part according to the desired geometry;
   repeatedly depositing layer upon layer of material onto the punch in a stacked configuration to modify a geometry of the stamping die to alter the geometry of the parts formed by the stamping die from the desired geometry to an altered geometry when closing the die; and
   closing the stamping die to form a second part according to the altered geometry.

2. The method of claim 1, wherein repeatedly depositing layer upon layer of material onto the punch in a stacked configuration comprises depositing material onto a localized region of an exterior surface of the punch that engages the cavity to form parts from sheet metal blanks.

3. The method of claim 2 further comprising removing material from a portion of the die-block along an exterior surface of the die-block that defines the cavity opposite of where material is being added to the localized region of the exterior surface of the punch that engages the cavity.

4. The method of claim 1, wherein repeatedly depositing layer upon layer of material onto the punch in a stacked configuration comprises depositing material onto the entirety of an exterior surface of the punch that engages the cavity to form parts from sheet metal blanks.

5. The method of claim 4, wherein the material that is deposited onto the entirety of the exterior surface of the punch is substantially uniform in thickness.

6. The method of claim 1, wherein the material is repeatedly deposited layer upon layer onto the punch in a stacked configuration via a three dimensional printing process.

7. The method claim 6, wherein the three dimensional printing process is directed energy deposition.

8. The method claim 6, wherein the three dimensional printing process is electron beam freeform fabrication.

9. A method comprising:
   providing a two-sided stamping die configured to form parts from sheet metal blanks according to a desired geometry upon closing the die;
   closing the stamping die to form a first part according to the desired geometry;
   repeatedly depositing layer upon layer of material onto a first side of the die in a stacked configuration to modify a geometry of the first side of the die to alter the geometry of the parts formed by the stamping die from the desired geometry to an altered geometry; and
   closing the stamping die to form a second part according to the altered geometry.

10. The method of claim 9, wherein repeatedly depositing layer upon layer of material onto a first side of the die in a stacked configuration comprises depositing material onto a localized region of an exterior surface of the first side of the die that engages a second side of the die to form parts from sheet metal blanks.

11. The method of claim 10 further comprising removing material from the second side of the die along an exterior surface of the second side opposite of where material is being added to the localized region of the exterior surface of the first side of the die.

12. The method of claim 11, wherein the first side of the die is a die-block that defines a cavity.

13. The method of claim 12, wherein the second side of the die is a punch that is configured to engage the cavity to form the parts from sheet metal blanks.

14. The method of claim 9, wherein repeatedly depositing layer upon layer of material onto a first side of the die in a stacked configuration comprises depositing material onto the entirety of an exterior surface of the first side of the die that engages an exterior surface of a second side of the die to form parts from sheet metal blanks.

15. The method of claim 14, wherein the material that is deposited onto the entirety of the exterior surface of the first side of the die is substantially uniform in thickness.

16. The method of claim 9, wherein the material is repeatedly deposited layer upon layer onto the first side of the die in a stacked configuration via a three dimensional printing process.

17. The method of claim 16, wherein the three dimensional printing process is directed energy deposition.

18. The method of claim 16, wherein the three dimensional printing process is electron beam freeform fabrication.

19. A method comprising:
   providing a stamping die having a punch that engages a cavity defined by a die-block along a profile of the punch when the die is closed to form parts from sheet metal blanks of a first thickness according to a desired contour;
   closing the stamping die on a first sheet metal blank having a thickness that is the same as the first thickness to form a first part according to the desired contour;
   repeatedly depositing layer upon layer of material onto the profile of the punch in a stacked configuration while maintaining the profile of the punch such that closing the die forms parts from sheet metal blanks of a second thickness that is less than the first thickness according to the desired contour; and closing the stamping die on a second sheet metal blank having a thickness that is the same as the second thickness to form a second part according to the desired contour.

20. The method of claim 19, wherein the material that is deposited onto the profile of the punch is substantially uniform in thickness.

* * * * *